Nov. 9, 1954     W. MORSTAD     2,693,860
FENDER MOUNTED TRACTOR BRAKE LOCK LEVER
Filed April 25, 1952
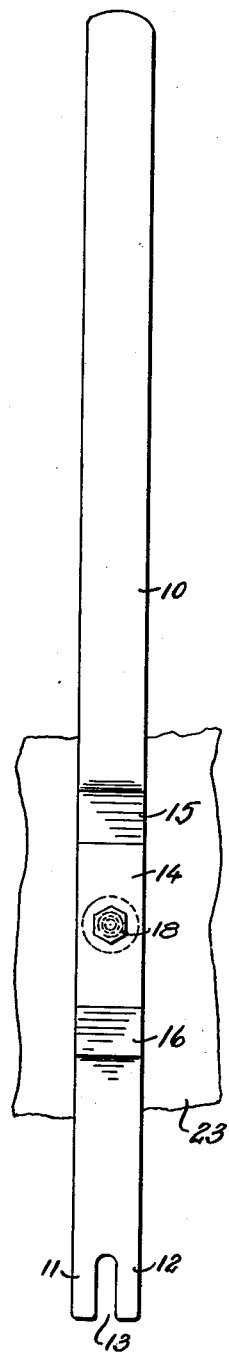
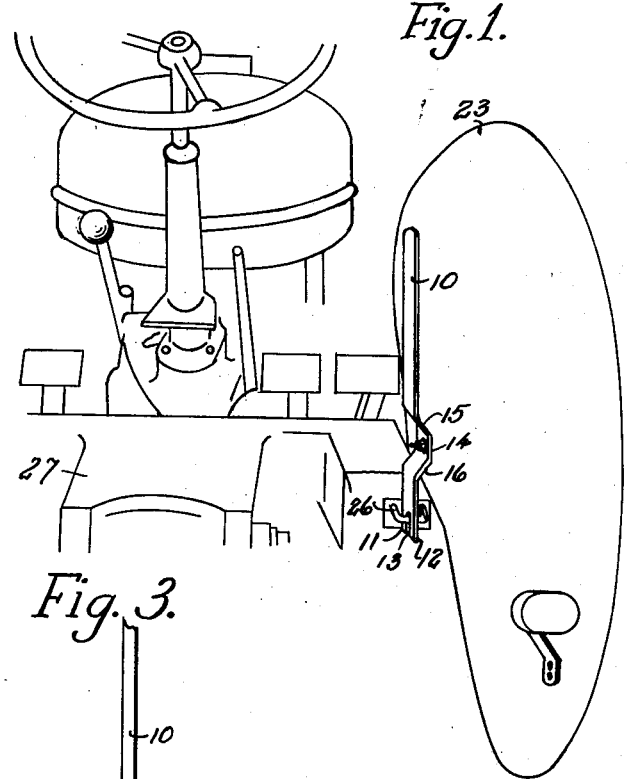
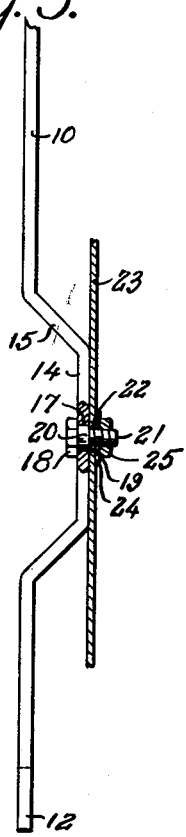
*INVENTOR.*
WALDO MORSTAD
BY
ATTORNEYS United States Patent Office 2,693,860
Patented Nov. 9, 1954

2,693,860

FENDER MOUNTED TRACTOR BRAKE LOCK LEVER

Waldo Morstad, Raymond, Mont.

Application April 25, 1952, Serial No. 284,405

1 Claim. (Cl. 180—77)

This invention relates to attachments for tractors, and in particular a hand lever pivotally mounted on a fender of a tractor and positioned whereby a fork in the lower end of the lever extends over the brake lock ring whereby the brake may be locked with the hand lever.

The invention is a safety device or attachment for use on a tractor as in numerous instances and particularly in cold weather when an operator is wearing heavy clothing or when the operator is comparatively heavy it is difficult for the operator to bend over to reach the conventional lock ring of the brakes. Furthermore the improved device of this invention increases the safety of the tractor as an operator reaching for the lock ring often loses his balance and releases his pressure on the foot clutch pedal or on the pedal of the foot brake whereby the tractor runs forwardly or rearwardly, being out of control of the operator.

With the lock ring actuated by a lever pivotally mounted on the fender it is easy to actuate the brake and the safety of the operator of the tractor is consequently increased. With the lock ring positioned in the floor it is necessary for the operator to bend over to pick up the ring from the floor and while in this position it is possible for the tractor to get out of control. With the brake lock ring actuated by a hand lever the lock ring may be easily and at the same time safely actuated, as the operator may actuate the lock ring to set the brakes while positioned in an upright position upon the seat of the tractor.

The purpose of this invention is to provide means whereby the operator of a tractor can lock the brake while in an upright position on the seat without the necessity of bending down and locating the conventional lock ring in the floor.

In several different types of tractors such as the McCormick W9 Series the brakes may be locked with a ring positioned in the floor and, particularly in cold icy weather it is difficult for an operator on the seat to reach the locking ring and draw the ring outwardly to lock the brakes. With this thought in mind this invention contemplates a lever having a fork on the lower end and means pivotally mounting the lever on a fender of a tractor whereby the fork extends over the brake locking ring whereby the ring may be actuated by the lever.

The object of this invention is, therefore, to provide means for forming a hand lever so that with the lever pivotally mounted on the fender of a tractor a fork on the lower end may extend over the conventional brake locking ring of the tractor.

Another object of the invention is to provide a hand lever for actuating the brake locking ring of a tractor that may be installed on a tractor without changing parts of the tractor or the position of the brake locking ring thereon.

A further object of the invention is to provide a hand lever for actuating a brake locking ring of a tractor in which the lever and mounting means therefor are of simple and economical construction.

With these and other objects and advantages in view the invention embodies a lever having a handle on one end and a fork on the other and in which the intermediate portion between the handle and fork is offset to provide a bearing section through which a bolt may be extended for pivotally mounting the lever on a fender of a tractor.

Other features and advantages of the invention will appear from the following description taken in connection with the drawing, wherein:

Figure 1 is an elevational view illustrating the position of the brake locking ring of a tractor and showing the hand lever of this invention pivotally mounted on the fender of the tractor with the handle extended upwardly and with a fork on the lower end extended over the brake locking ring.

Figure 2 is a detail showing an elevational view of the hand lever for actuating the brake locking ring of a tractor, the parts being shown on an enlarged scale.

Figure 3 is a side elevational view showing the lower end and intermediate part of the brake locking lever as illustrated in Fig. 2, parts being broken away and shown in section to illustrate the pivotal mounting thereof.

Referring now to the drawing wherein like reference characters denote corresponding parts the brake ring lock actuating lever of this invention includes a lever having a handle 10 with a fork formed on a bifurcated section at the opposite end with sections 11 and 12 separated by a slot 13.

The intermediate part of the lever is provided with an offset section 14 having diagonally disposed sections 15 and 16 and the section 14 is provided with an opening 17 through which a bolt 18 extends, as illustrated in Fig. 3.

The bolt 18 is provided with a shoulder 19 which is positioned at the end of a cylindrical section 20 and a threaded stud 21, which extends from the section 20 is positioned in an opening 22 in a fender 23 with a washer 24 on the stud and clamped against the inner surface of the fender 23 with a nut 25. The length of the cylindrical section 20 of the bolt is greater than the thickness of the section 14 of the hand lever whereby binding is prevented and the hand lever is free to rotate on the bolt.

The opening 22 is positioned whereby the fork formed with the slot 13 and sections 11 and 12 extends over the brake locking ring 26 of a tractor as indicated by the numeral 27 and with the hand lever in this position, as illustrated in Fig. 1, the brake locking ring is readily actuated by the lever whereby the brakes are readily locked until released by the foot brake lever.

It will be understood that the lever may be provided in different sizes and formed of different designs to correspond with different types of tractors.

With the hand lever pivotally mounted in this manner and positioned to actuate the brake lock ring it will be noted the brake lock ring may be actuated by an operator in an upright position on the seat of the tractor and consequently the brakes may be easily and safely actuated.

It will be understood that other modifications may be made in the design and arrangements of the parts without departing from the spirit of the invention.

What is claimed is:

A tractor brake locking ring actuator comprising a lever having an offset intermediate section with an extended upper end providing a handle and having a bifurcated lower end providing a fork, diagonally disposed outwardly diverging sections connecting the handle and lower end to the intermediate section, and means receivable in the medial portion of the intermediate section for pivotally mounting the lever on the fender of a tractor with the fork positioned to receive a brake locking ring of the tractor.

References Cited in the file of this patent

UNITED STATES PATENTS

| Number | Name | Date |
| --- | --- | --- |
| 444,757 | Leslie | Jan. 13, 1891 |
| 1,402,851 | Ekiss et al. | Jan. 10, 1922 |
| 1,490,328 | Knutson | Apr. 15, 1924 |
| 1,494,363 | Lusebrink | May 20, 1924 |
| 2,524,205 | Orelind | Oct. 3, 1950 |